United States Patent
Ravimohan et al.

(10) Patent No.: US 9,891,847 B2
(45) Date of Patent: Feb. 13, 2018

(54) BLOCK MANAGEMENT IN A DUAL WRITE MEMORY SYSTEM

(71) Applicant: SanDisk Technologies Inc., Plano, TX (US)

(72) Inventors: Narendhiran Chinnaanangur Ravimohan, Bangalore (IN); Abhijeet Manohar, Bangalore (IN); Muralitharan Jayaraman, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 260 days.

(21) Appl. No.: 14/811,277

(22) Filed: Jul. 28, 2015

(65) Prior Publication Data

US 2017/0031612 A1    Feb. 2, 2017

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0616* (2013.01)

(58) Field of Classification Search
CPC ...... G06F 3/0679; G06F 3/061; G06F 3/0688; G06F 3/0619; G06F 3/0616; G06F 12/0246; G06F 2212/2022; G06F 2212/214; G06F 3/0656; G11C 11/4093; G11C 16/12; G11C 16/16
See application file for complete search history.

(56) References Cited

U.S. PATENT DOCUMENTS

| | | | | |
|---|---|---|---|---|
| 5,611,042 A | * | 3/1997 | Lordi | G06F 11/1032 714/6.1 |
| 2013/0128671 A1 | * | 5/2013 | Shin | G11C 16/10 365/185.18 |
| 2014/0157086 A1 | * | 6/2014 | Sharon | G06F 11/1012 714/773 |
| 2016/0098213 A1 | * | 4/2016 | Franceschini | G06F 3/0616 711/103 |

* cited by examiner

*Primary Examiner* — Reginald Bragdon
*Assistant Examiner* — Thanh Vo
(74) *Attorney, Agent, or Firm* — Brinks Gilson & Lione

(57) ABSTRACT

A storage device with a memory may improve yield by reducing the allocation of blocks for secondary writes in a dual programming system. In a dual programming system, all host writes are written to both a primary copy and to a secondary copy. If the secondary copy blocks that are available have a higher endurance, then the overall allocation of available blocks for use as a secondary copy block can be reduced (improving yield). In one embodiment, utilizing different trim parameters for the secondary copy blocks may be used to increase the endurance for those blocks. Before programming the secondary copy, the trim parameters may be adjusted to increase endurance and after programming the secondary copy, the trim parameters may be adjusted back to the default value that is used when programming the primary copy.

20 Claims, 11 Drawing Sheets

BLOCK MANAGEMENT IN A DUAL WRITE MEMORY SYSTEM

TECHNICAL FIELD

This application relates generally to memory devices. More specifically, this application relates to optimizing block usage in a dual programming memory system.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. NAND is one example of a non-volatile flash memory. Flash memory may have a limited endurance, which determines a number of times a particular memory can be erased and re-programmed. As the non-volatile memory cell scales to smaller dimensions with higher capacity per unit area, the cell endurance due to program and erase cycling, and disturbances (e.g. due to either read or program) may become more prominent. The overall vulnerability of memory cells and the defect level during the silicon process may become elevated as the cell dimension shrinks and process complexity increases, which directly affects the data integrity at both the memory and system. Errors in the memory may result in a portion of the memory being unusable. Improving yield may include only partial block management where only defective wordlines are mapped out and left unused.

DESCRIPTION OF THE EMBODIMENTS

For a dual programming scheme it may be beneficial to reduce the allocation of blocks. A storage device with a memory may improve yield by reducing the allocation of blocks for secondary writes in a dual programming (dual writing) environment. The yield is improved by allowing for more bad blocks in the memory system. In a dual programming system, all host writes are written to both a primary copy and to a secondary copy. If the secondary copy blocks that are available have a higher endurance, then the overall allocation of available blocks for use as a secondary copy can be reduced (improving yield). In one embodiment, utilizing different trim parameters for the secondary copy blocks may be used to increase the endurance for those blocks. The data retention for the high endurance blocks may be decreased, but since the blocks are not used frequently, the data retention is less of an issue. Before programming the secondary copy, the trim parameters may be adjusted to increase endurance and after programming the secondary copy, the trim parameters may be adjusted back to the default value that is used when programming the primary copy.

If the primary block and the secondary block had the same endurance, then the available blocks may be maintained in the same pool. However, since the secondary block will have a higher endurance (by modifying the trim parameters) then the available blocks for secondary may be maintained in a separate pool. The pool size for the secondary blocks may be reduced. However, because the endurances are different between primary and secondary, then the separate pools for those blocks may also be subject to wear leveling separately.

Figure 1A:
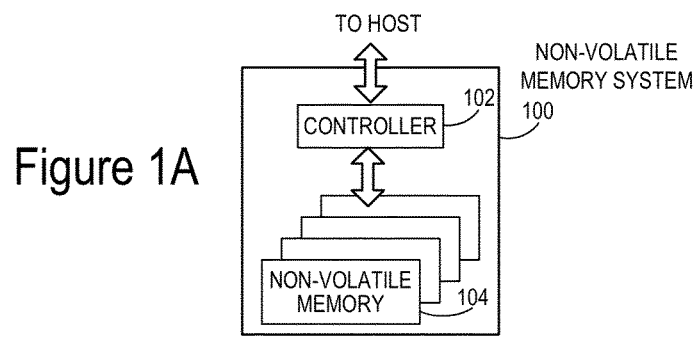
FIG. 1A is a block diagram of an example non-volatile memory system.

FIGS. 1A-2B are exemplary memory systems which may implement dual programming with trim adjustments for the secondary block copy. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The non-volatile memory die 104 may store an operating system for the host.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid state disk (SSD) drive installed in a personal computer.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
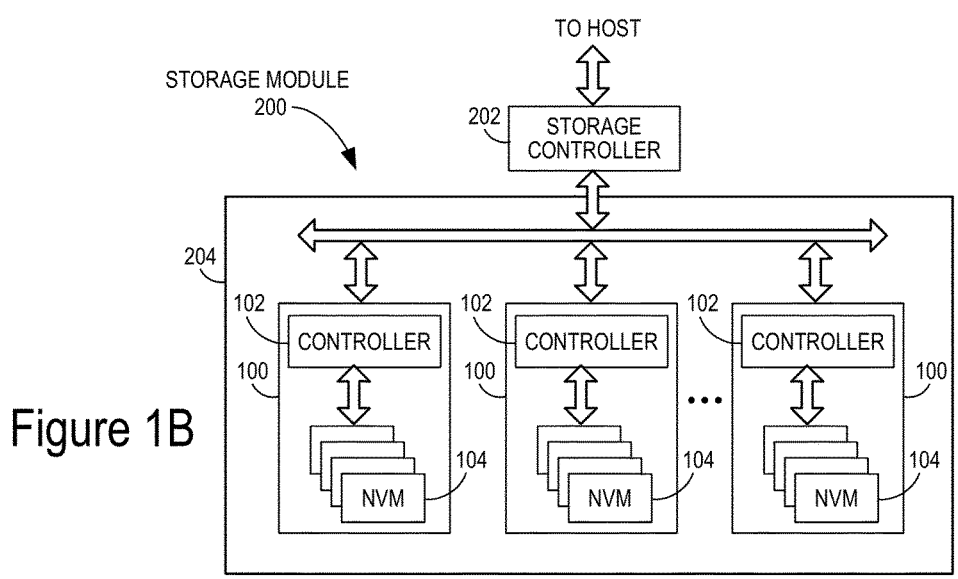
FIG. 1B is a block diagram of a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
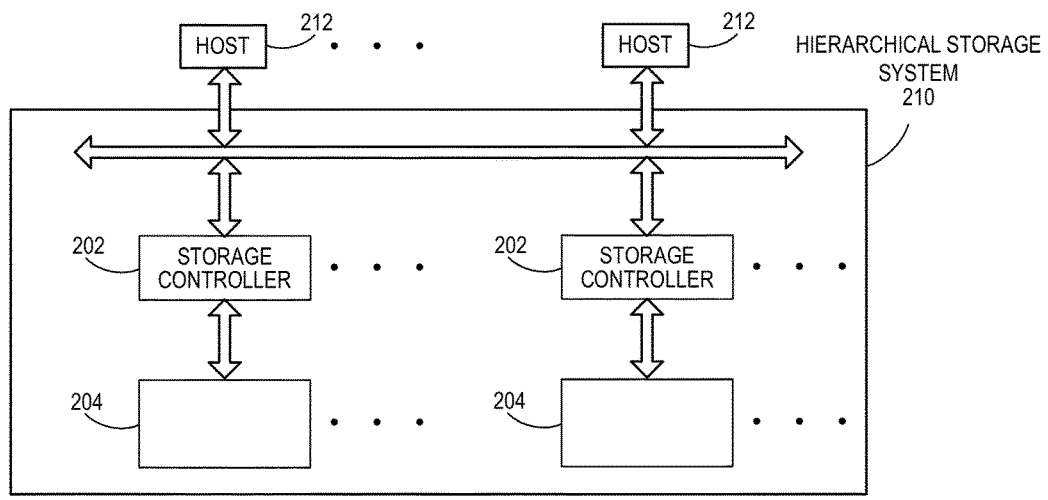
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
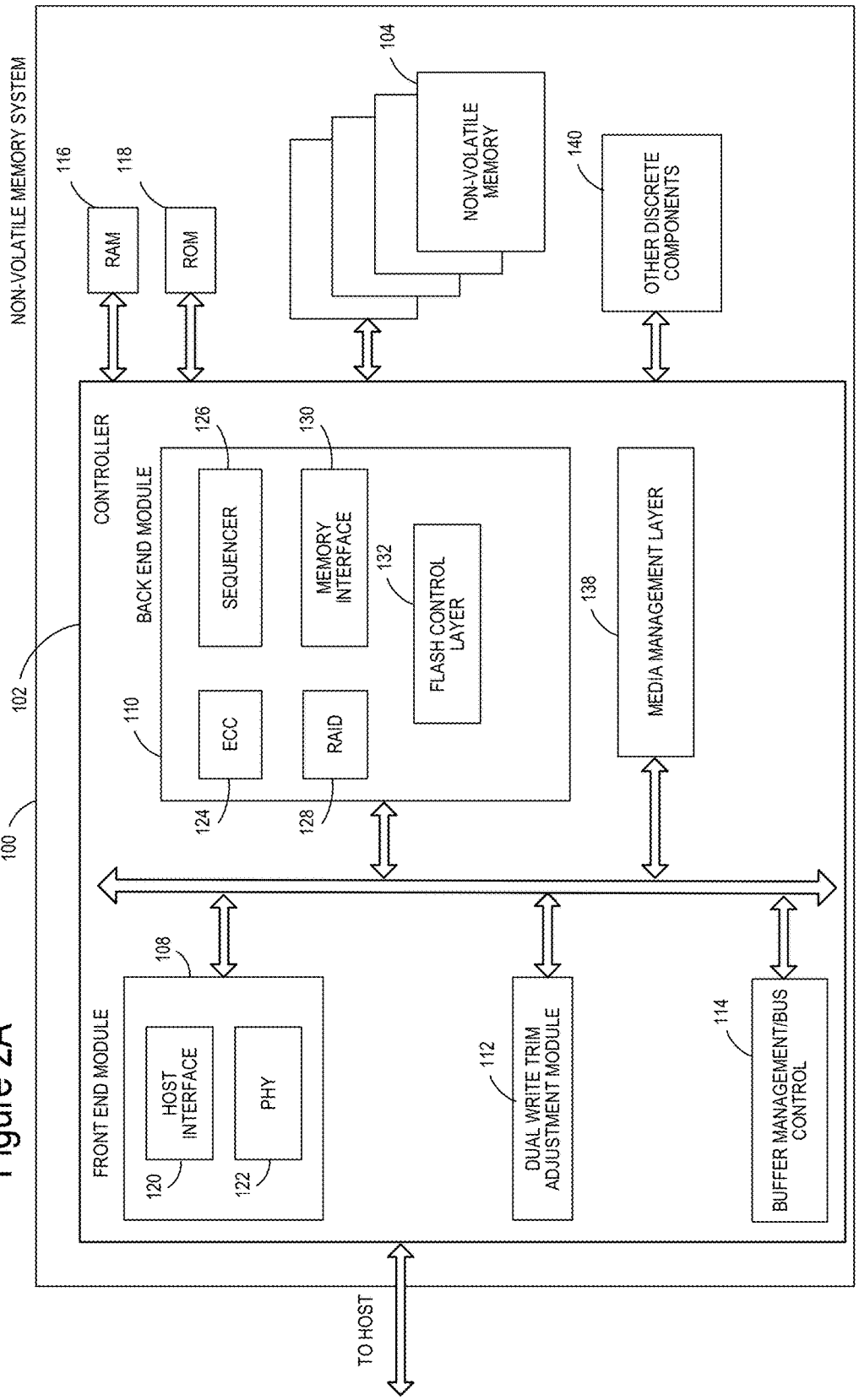
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

The controller 102 may include a dual write trim adjustment module 112. The dual write trim adjustment module 112 may adjust the trim parameters for programming of the secondary copy or secondary block with a dual programming/write scheme. The adjustments to the trim parameters are described below, but generally include adjustments to increase the endurance of blocks used for the secondary copy.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in Figure. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

The FTL or MML 138 may be integrated as part of the flash management that may handle flash errors and interfacing with the host. In particular, MML may be a module in flash management and may be responsible for the internals of NAND management. In particular, the MML 138 may include an algorithm in the memory device firmware which translates writes from the host into writes to the flash memory 104. The MML 138 may be needed because: 1) the flash memory may have limited endurance; 2) the flash memory 104 may only be written in multiples of pages; and/or 3) the flash memory 104 may not be written unless it is erased as a block. The MML 138 understands these potential limitations of the flash memory 104 which may not be visible to the host. Accordingly, the MML 138 attempts to translate the writes from host into writes into the flash memory 104. As described below, erratic bits may be identified and recorded using the MML 138. This recording of erratic bits can be used for evaluating the health of blocks.

Figure 2B:
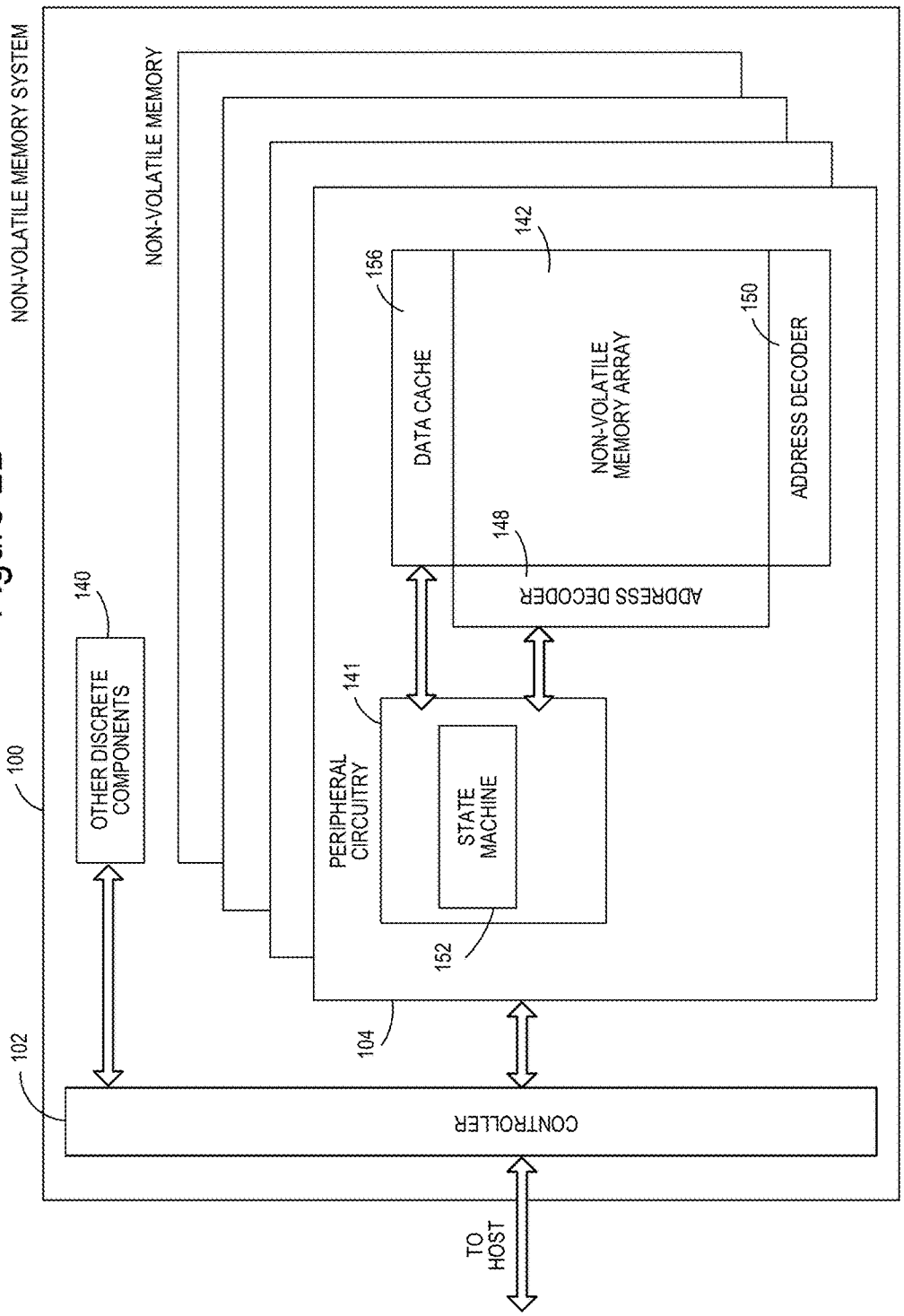
FIG. 2B is a block diagram of exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

In one embodiment, the peripheral circuitry 141 may be a heat source. The location of the peripheral circuitry 141 relative a block may affect the temperature of that block, such that blocks closest to the peripheral circuitry 141 may have the highest local temperature. Exemplary peripheral circuitry 141 may include clocks, pumps, ESD, current shunt, current sink, and/or closely-packed logic circuits.

Figure 3:
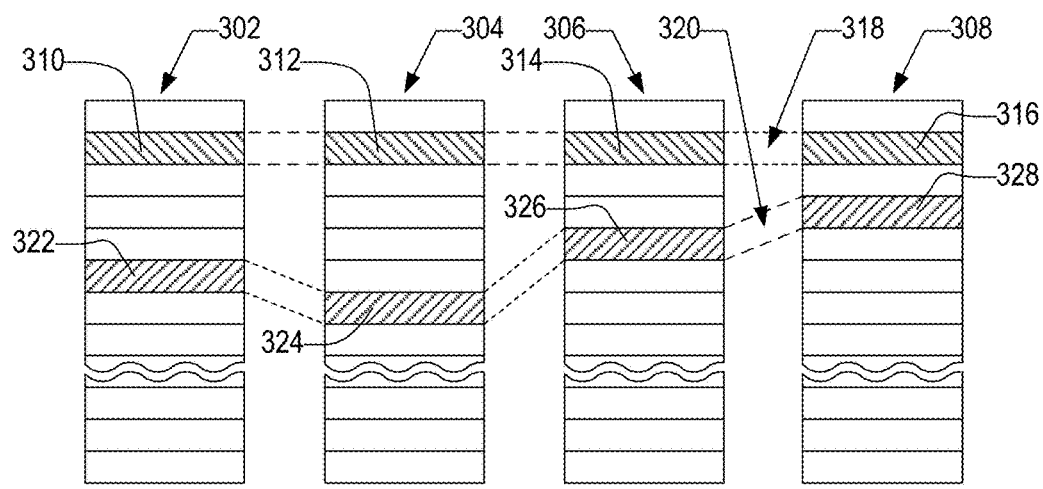
FIG. 3 is an example physical memory organization of the system of FIGS. 1A-2B.

FIG. 3 conceptually illustrates an organization of the flash memory 104 (FIGS. 1A-2B) as a cell array. The flash memory 104 may include multiple memory cell arrays which are each separately controlled by a single or multiple memory controllers 102. Four planes or sub-arrays 302, 304, 306, and 308 of memory cells may be on a single integrated memory cell chip, on two chips (two of the planes on each chip) or on four separate chips. Although, FIGS. 6-9 describe dual programming at the block level, the programming may be at a different level (e.g. page level or meta-block level).

Other numbers of planes, such as 1, 2, 8, 16 or more may exist in a system. The planes may be individually divided into groups of memory cells that form the minimum unit of erase, hereinafter referred to as blocks. Blocks of memory cells are shown in FIG. 3 by rectangles, such as blocks 310, 312, 314, and 316, located in respective planes 302, 304, 306, and 308. There can be any number of blocks in each plane. The block of memory cells is the unit of erase, and the smallest number of memory cells that are physically erasable together. For increased parallelism, however, the blocks may be operated in larger metablock units or chunks. One block from each plane is logically linked together to form a metablock. The four blocks 310, 312, 314, and 316 are shown to form one metablock 318. All of the cells within a metablock are typically erased together. The blocks used to form a metablock need not be restricted to the same relative locations within their respective planes, as is shown in a second metablock 320 made up of blocks 322, 324, 326, and 328. Although it is usually preferable to extend the meta-blocks across all of the planes, for high system performance, the memory system can be operated with the ability to dynamically form metablocks of any or all of one, two or three blocks in different planes. This allows the size of the metablock to be more closely matched with the amount of data available for storage in one programming operation. As described below with respect to FIG. 6, the meta-block may be created with planes from different dies. In other words, each meta-block includes planes from different dies.

Figure 4:
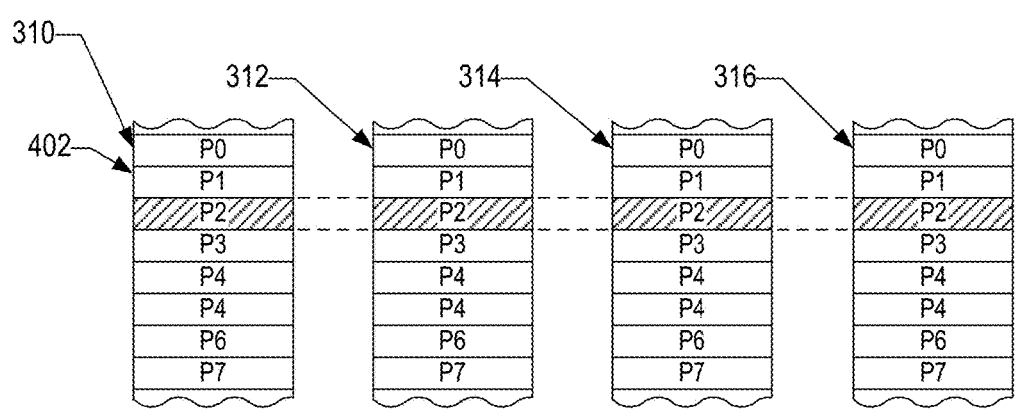
FIG. 4 is an expanded view of a portion of the physical memory of FIG. 3.

The individual blocks may be divided for operational purposes into pages of memory cells, as illustrated in FIG. 4. The memory cells of each of the blocks 310, 312, 314, and 316, for example, are each divided into eight pages P0-P7.

Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 402 is illustrated in FIG. 3, being formed of one physical page from each of the four blocks 310, 312, 314, and 316. The metapage 402, for example, includes the page P2 in each of the four blocks but the pages of a metapage need not necessarily have the same relative position within each of the blocks. A metapage may be the maximum unit of programming.

The memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Both types of memory cells may be used in a memory, for example binary SLC flash memory may be used for caching data and MLC memory may be used for longer term storage. The charge storage elements of the memory cells are most commonly conductive floating gates but may alternatively be non-conductive dielectric charge trapping material.

The block exchange described herein may be within a dual write or dual programming scheme. An exemplary dual programming scheme is described with respect to FIGS. 5-7. Dual programming is further described in U.S. patent application Ser. No. 14/291,560, filed on May 30, 2014, entitled "PROTECTION SCHEME WITH DUAL PROGRAMMING OF A MEMORY SYSTEM", the entire disclosure of which is herein incorporated by reference.

Figure 5:
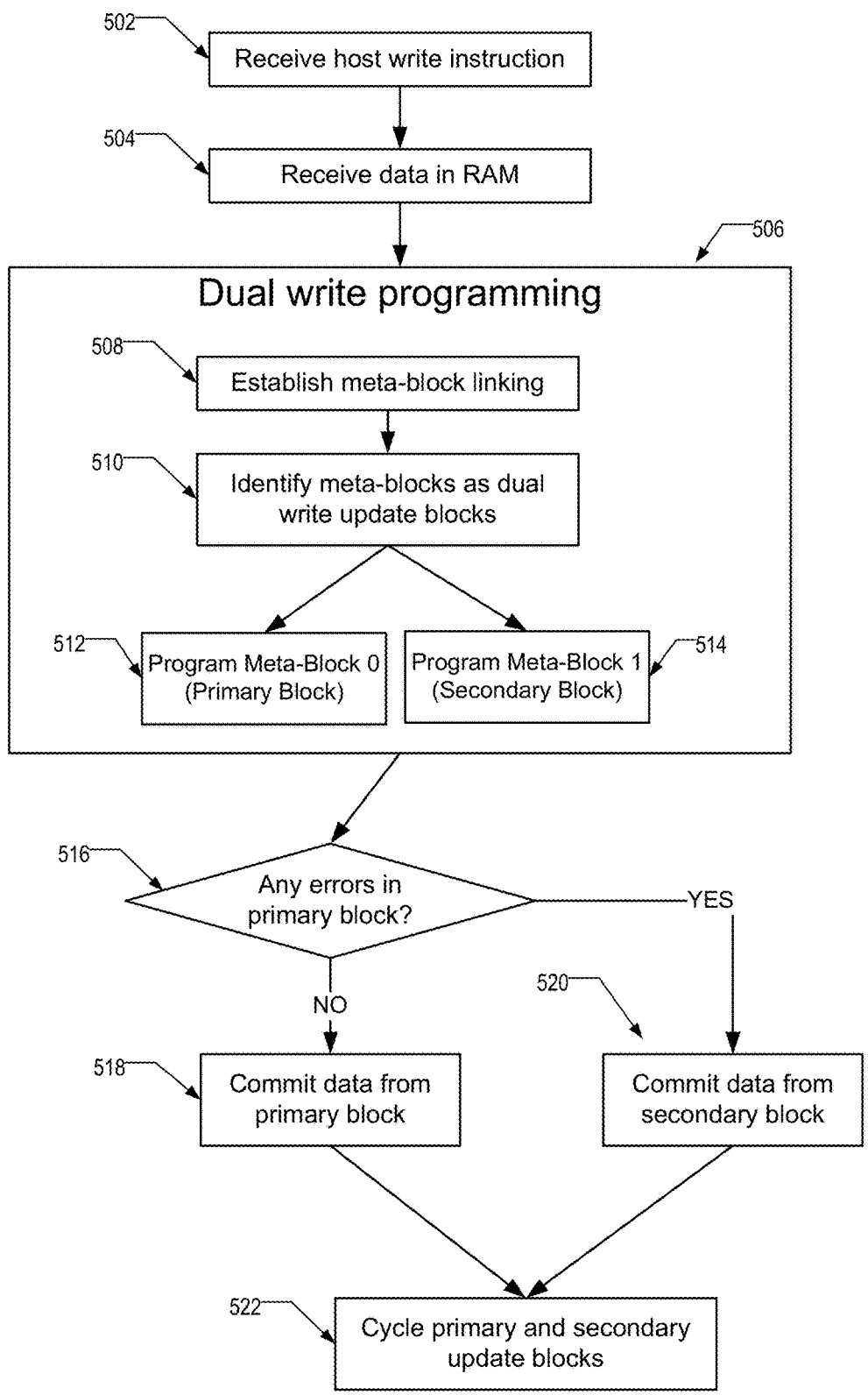
FIG. 5 is flow chart illustrating an exemplary dual programming process.

FIG. 5 is flow chart illustrating an exemplary dual programming process. FIG. 5 illustrates an exemplary process by which data protection may be achieved through the dual writing to multiple meta-blocks. In block 502, a host write instruction is received at the memory system (e.g. at the host interface). Based on the instruction from the host (to program certain data on the memory), the data is received in RAM in block 504. From the RAM, the memory system may utilize the dual programming in block 506. Dual programming may include simultaneous or near simultaneous programming of the same data in different blocks. In the embodiment described below, the data is written to two blocks, but in other embodiments, there may be additional blocks for programming the data for added protection. The dual programming 506 may include an initial establishment of meta-block linking in block 508. The meta-block linking may not occur as part of every host write instruction, but rather may be set upon initialization and further updated (e.g. as in the cycling of blocks as discussed below in block 522). In other words, the establishing of meta-block linking may be optional for each host write if meta-block linking previously occurred. The meta-blocks that are to be used for dual programming update blocks may be identified in block 510. The host data is written to two update blocks, primary and secondary, simultaneously or substantially simultaneously. The identification may include the identification of meta-block 0 (i.e. "primary block") and a meta-block 1 ("secondary block").

Figure 6:
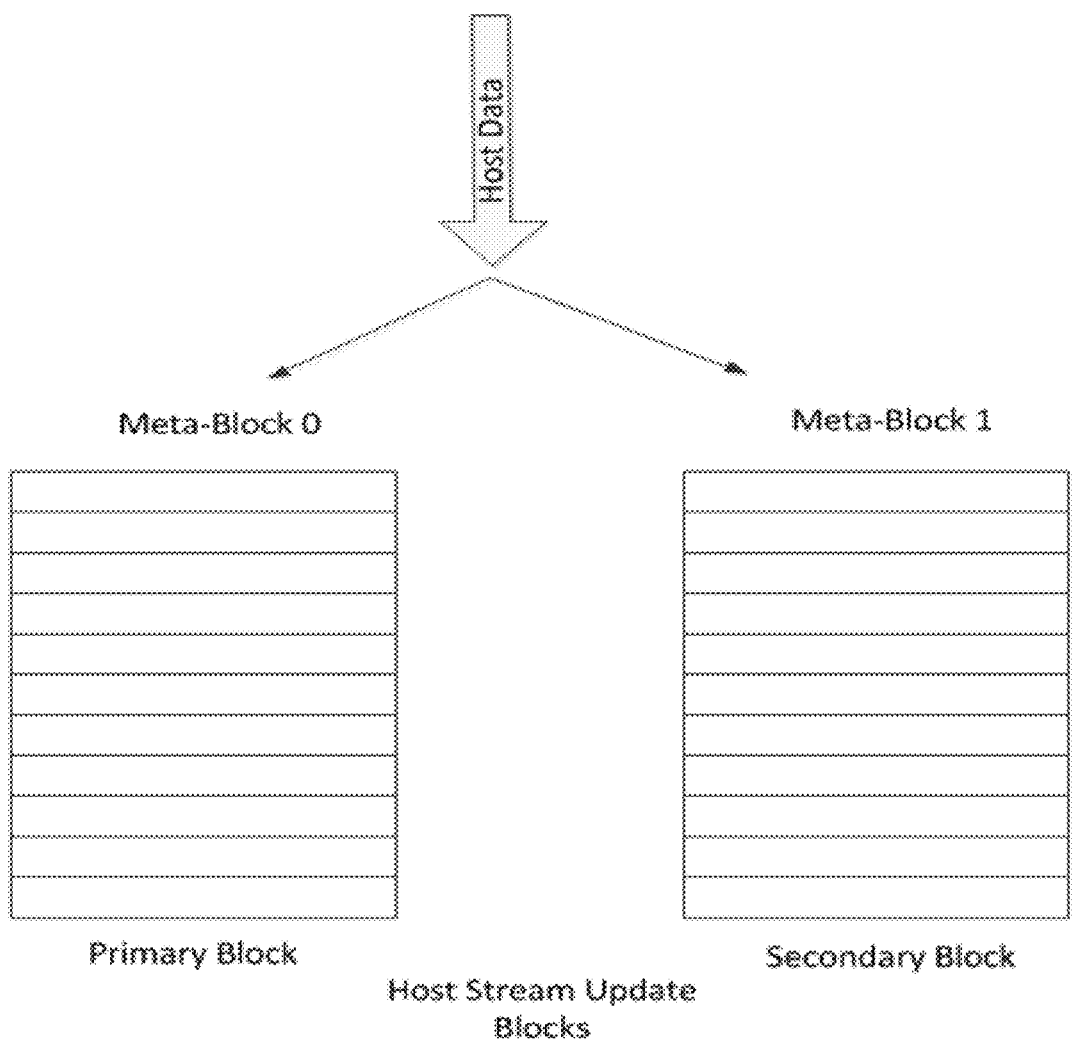
FIG. 6 is a diagram of an exemplary host stream to update blocks.

FIG. 6 is a diagram of an exemplary host stream to update blocks. The primary block is programmed in block 512 and the secondary block is programmed in block 514 as further illustrated in FIG. 6. FIG. 6 illustrates that the host data that is received from the host is programmed to both the primary block and the secondary block. Having the data programmed twice can be a fail-safe for retrieving data when there has been a failure. For example, if there is a failure in the primary block, then the data is not lost because the secondary block may be used to retrieve the data as further discussed below with respect to blocks 516-520 in FIG. 5.

FIG. 6 illustrates a single exemplary stream, but in some embodiments, there may be multiple streams. For example, there may be different files of host data to be written and each file may be written using a different host stream. The utilization of multiple streams may be for optimization and may help prevent or reduce defragmentation by streaming sequential data. As described below, each of the streams may be identified by a stream identifier or stream index so that the blocks of that stream can be identified after a power cycle or power loss.

Referring back to FIG. 5, when the dual programming 506 has occurred and the meta-blocks are programmed, there may be an error checking function that is performed before the data is committed to the memory from the update block. In block 516, errors in the primary block are checked, such as with enhanced post-write-read error management (EPWR). If there are no uncorrectable error codes (UECC) from EPWR in the primary block, then the data is committed from the primary block as in block 518. If there is a UECC in the primary block, then the data may be committed from the secondary block in block 520 (e.g. FIG. 7). After programming a certain number of wordlines (WLs) in the primary block, EPWR may be performed before committing the data in those WLs. If there is a UECC during EPWR or program failure or WL-WL short while programming the primary block, the data in the affected logical pages may be indexed from the secondary block, rather than the primary block.

Figure 7:
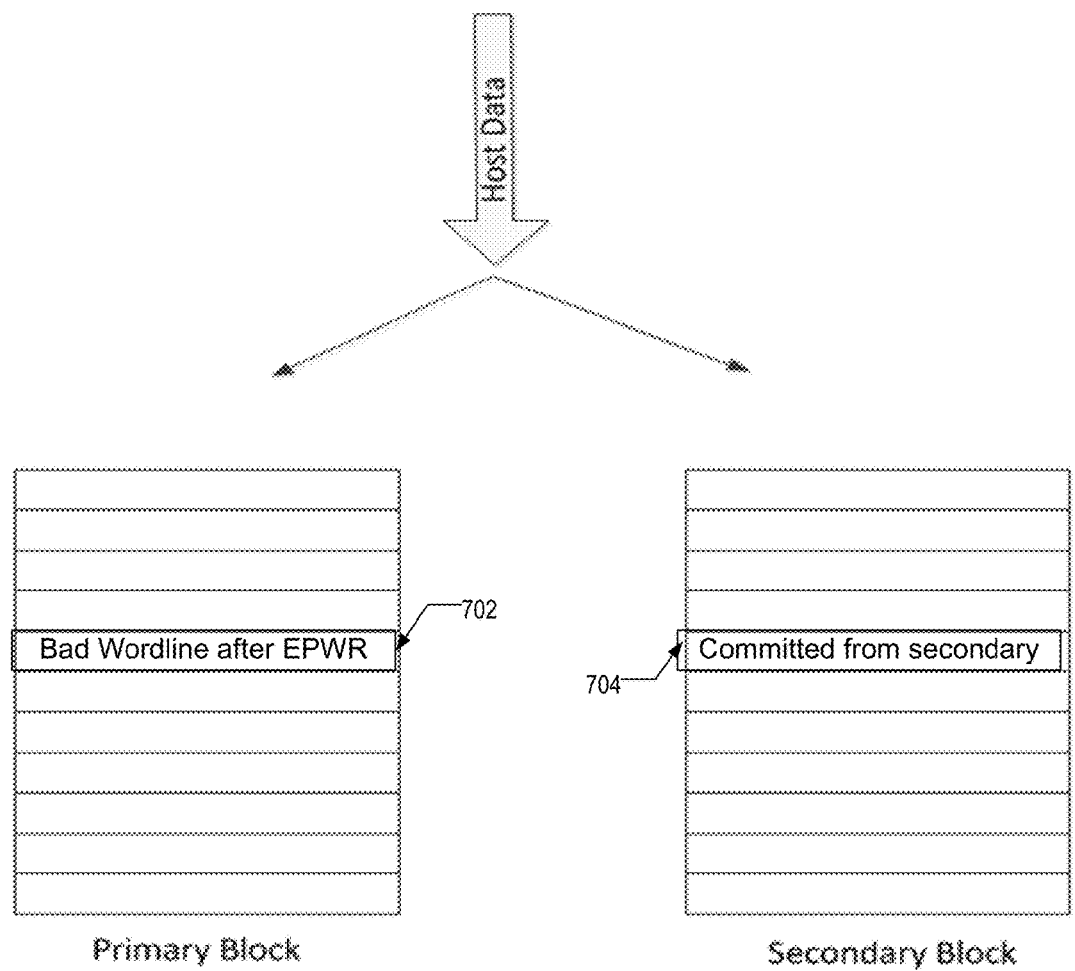
FIG. 7 is a diagram of an exemplary host stream in which data is committed from a secondary block.

FIG. 7 is a diagram of an exemplary host stream in which data is committed from a secondary block. The host data stream is copied twice to both the primary block and to the secondary block. The transfer process includes receiving the host write for the memory and then programming to the primary block and programming to the secondary block. FIG. 7 illustrates block 520 from FIG. 5 in which data is committed from the secondary block. If a bad wordline 702 is found in primary block, then the data is committed 704 from the secondary block.

Figure 8:
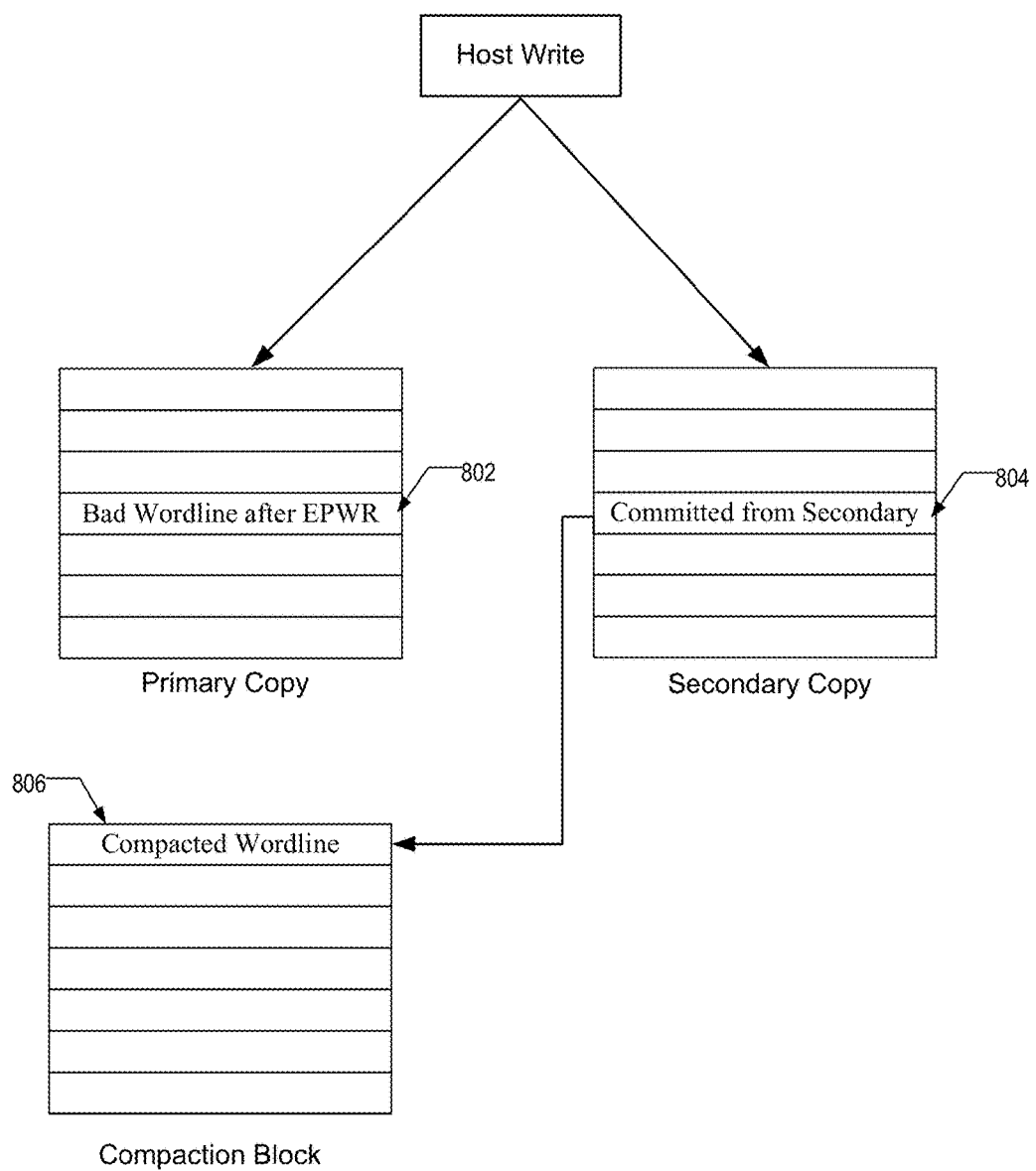
FIG. 8 is a diagram of dual programming with trim optimization.

FIG. 8 is a diagram of dual programming with trim optimization. An increase with the allowable error rate may result in a direct improvement in endurance. Accordingly, the error requirements for the secondary copy (which is rarely used) may be relaxed in order to increase endurance. The increase in endurance for the secondary block allows for the allocation of fewer blocks.

In order to improve block management and yield, the requirements for the secondary copy may be relaxed. For example, the trim set or trim parameters for the secondary copy may be different from those for the primary copy. The trim parameters may be related to erase/program and read. Exemplary trim settings include a program voltage ($V_{PGM}$), a step-up voltage, a delta voltage ($\Delta V_{PGM}$), number of loops for the delta voltage, read voltage ($V_{READ}$), voltage during erase ($V_{ERA}$), and/or a program pulse width. These exemplary trim parameters may be changed to improve endurance. In general, the slower the write, the better the endurance. The more optimal read levels ensure a lower BER over many program/erase (P/E) cycles thereby improving endurance. The modification of trim sets or trim parameters may include charge levels (i.e. read voltage parameters). Other trim parameters may be adjusted rather than just the voltage/charge level. Any access operation command may relate to a variety of trim parameters for that access operation, such as the voltages to be applied (e.g., read voltage, pass voltage, programming voltage, inhibit voltage, source potential, well potential, etc.), voltage differentials to be used (e.g., voltage step changes in programming pulses during a program operation), quantities (e.g., maximum number of programming pulses to be applied before deeming an error), etc. The trimming parameters of memory may be optimized for dual programming as described herein.

The data from a single level cell (SLC) block (e.g. secondary block) may be folded into a multi-level cell (MLC) block when committing data from the secondary block. Folding refers to a transfer of data from SLC memory into MLC memory or from a primary block. Data from a secondary block is compacted. In one example, three SLC cells could be written into a single 3-bit MLC cell. In this example, the three SLC cells are folded into the MLC memory. This process usually can be carried out at page level. As described, the secondary copy may be SLC memory (with a high endurance) that could be folded into MLC.

In one embodiment, the number of bits in error may be increased for the secondary copy as compared with the primary copy. For example, the threshold for errors in SLC memory that is used for folding may be 30 bits/2 k, but that may be changed to 100 bits/2 k for the secondary copy. The increased error tolerance may be acceptable because the secondary copy is usually not used (the secondary copy data is only committed when there is an error with the primary copy). In case of an error on the primary, the data from the secondary may be folded (during the initial cycles) and when the error rate becomes high the data can be compacted before folding. The trim on the secondary blocks may be a high endurance trim with minimal data retention. The data retention requirements may be low (e.g. data retention for a week) for data on the secondary blocks. By reducing the requirements for the secondary copy, there may be improvement in endurance, which translates into a reduced allocation of SLC blocks. The primary and secondary SLC blocks may be maintained in separate block pools and wear-levelled differently.

Since SLC pages are folded into MLC block, the errors from SLC may be propagated into MLC and add to the inherent errors of MLC. Whatever block may be chosen for folding may have a criterion that the error should be limited to 30 bit or 20 bit/2 k, in one example. A trim change may result in more endurance for the secondary blocks. Alternatively, with the same trim as primary, since the secondary blocks can go until 122 bits/2 k in one example, better endurance may be extracted out of the secondary blocks. Even with the same trim, primary blocks may be restricted to some cycles to restrict the errors to a limit, but secondary blocks may be used for more cycles as the restriction may be less.

Referring back to FIG. 8, the secondary block may be programmed with a high endurance trim that includes minimal data retention requirements. If a bad wordline is discovered in primary copy during EPWR 802, then data committed from the secondary block 804 may be compacted into a compacted wordline 806 in the compaction block. The process may include compaction after committing from the secondary. Compacting may include a transfer of data from the memory (e.g. NAND) to the controller, correction of bits using the ECC engine's correction capability, and a transfer back to the memory (e.g. NAND) and programming to a different block.

With a high endurance trim, fewer blocks need to be allocated for the secondary copy writes. This may be applied to applications like command queuing or closed ended command where the host informs the card of the number of sectors that it intends to write in that particular session. In such scenarios, the memory card may choose to use SLC blocks with minimal data retention and fold immediately into MLC. The other types of writes like open ended writes or small writes may still use normal trim blocks. The advantage is that the number of blocks allocated for SLC can be reduced thus improving yield. The saved number of blocks may be used for other purposes like increasing product endurance by increasing MLC pool size. The data committed from the secondary block may be folded into the MLC block if the errors are found to be below a threshold number.

Figure 9:
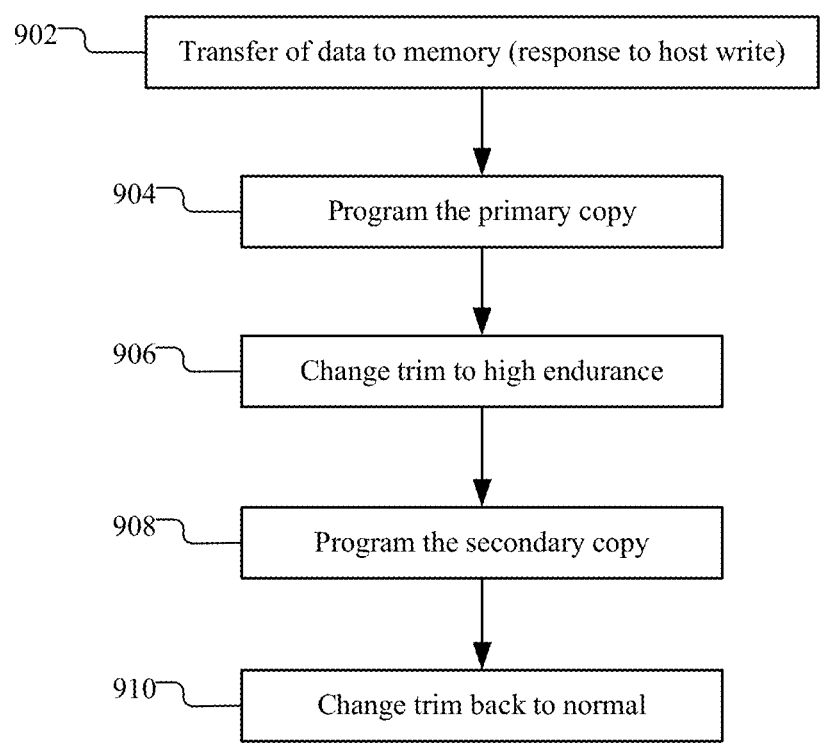
FIG. 9 is a flow chart illustrating a transfer diagram for dual programming.

FIG. 9 is a flow chart illustrating a transfer process for dual programming in which the trim is optimized. In block 902, a host write request is received and the data to be written is transferred to memory. The data is programmed to the primary copy in block 904. Before programming into the secondary copy for dual programming, the trim is modified in block 906. The trim modifications may include changes to increase the endurance for the secondary copy. After the trim modifications, the secondary copy is programmed in block 908 using the revised trim parameters. Because of the higher endurance trim parameters, fewer secondary copy blocks will be required. After the secondary copy is programmed, the trim parameters may be changed back to normal/default (i.e. not high endurance) in block 910.

Figure 10:
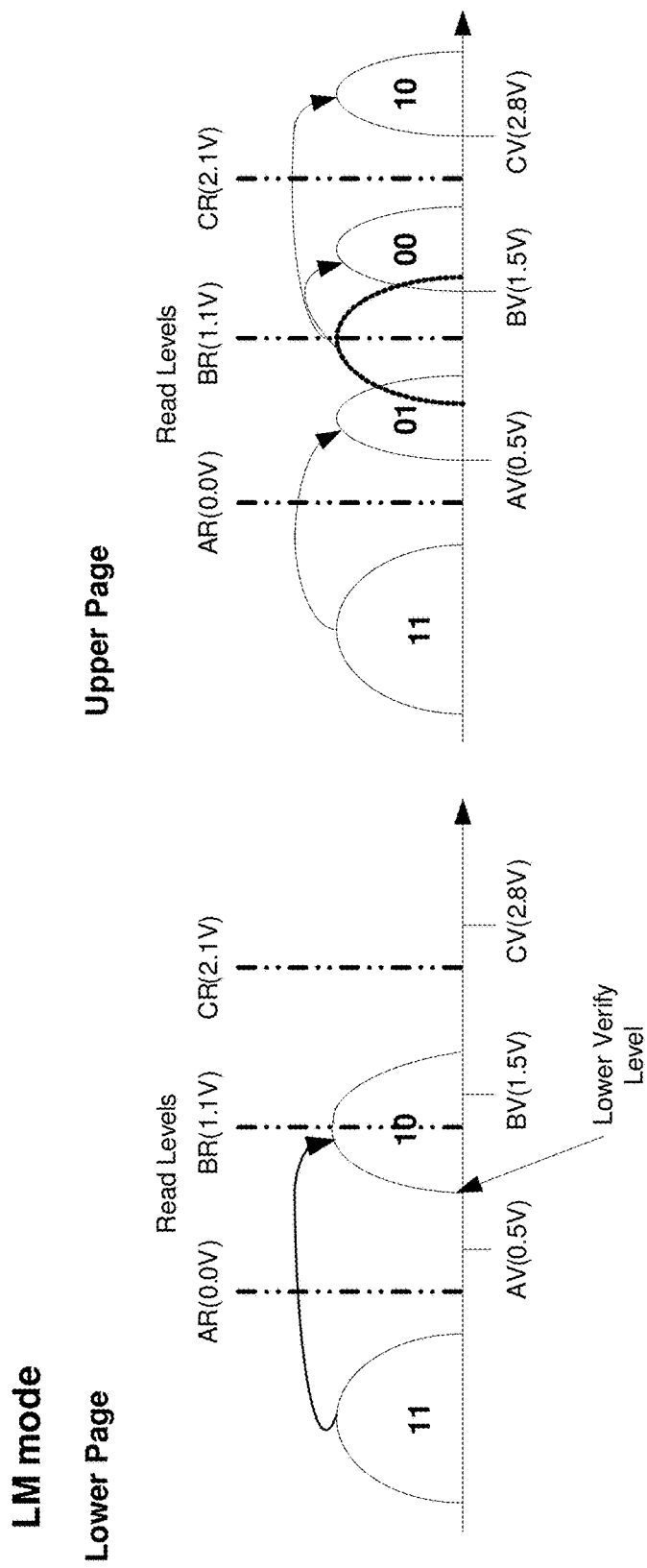
FIG. 10 is a diagram illustrating charge levels in a multi-level cell memory operated to store two bits of data in a memory cell.
Figure 11:
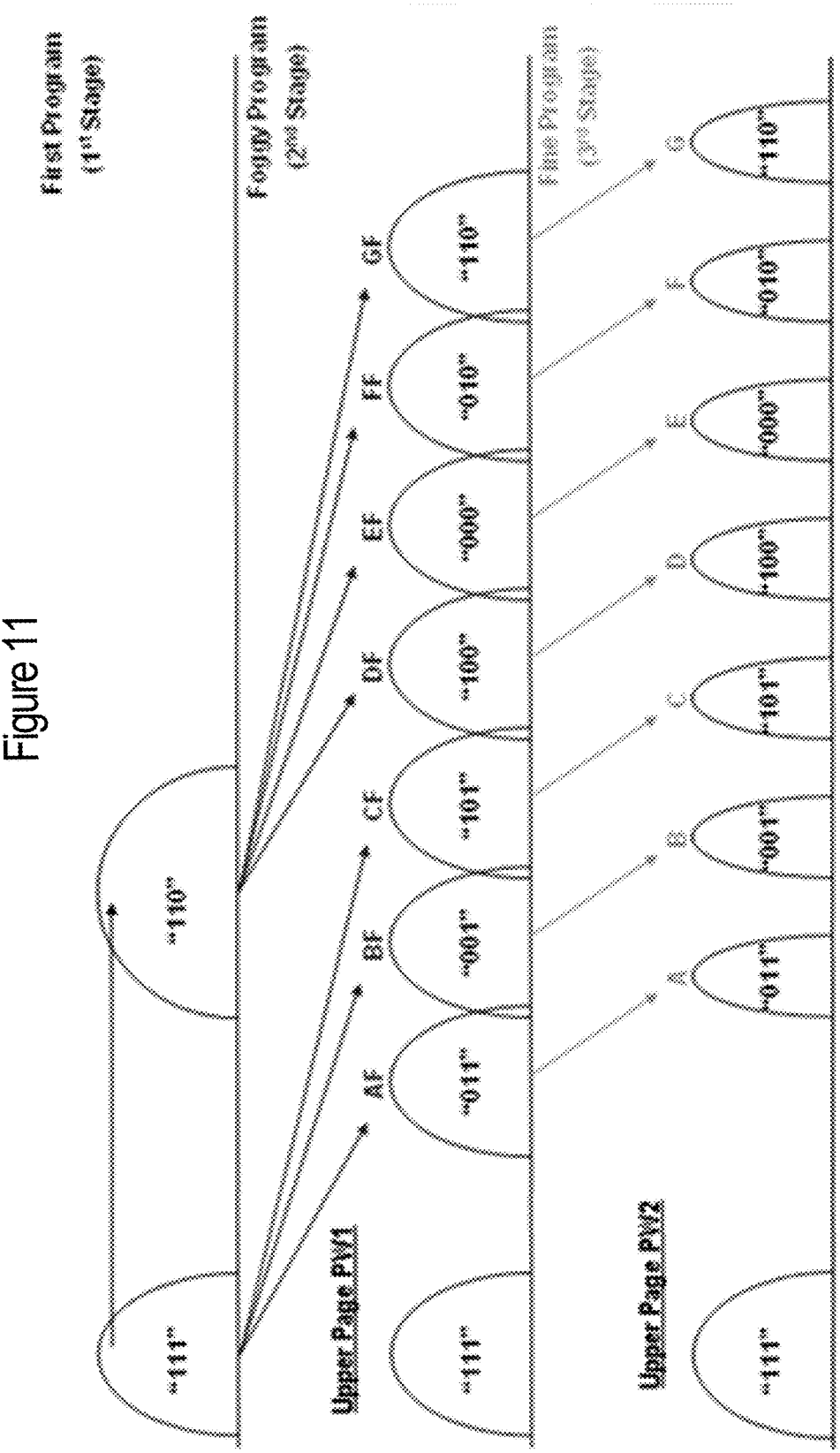
FIG. 11 is a diagram illustrating charge levels in a multi-level cell memory operated to store three bits of data in a memory cell.

FIG. 10 is a diagram illustrating charge levels in a multi-level cell memory operated to store two bits of data in a memory cell. The memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Alternatively, MLC memory may store eight states for retaining three bits of data. FIG. 10 illustrates MLC memory with two bits of data (four states) and FIG. 11 illustrates MLC memory with three bits of data (eight states). The charge storage elements of the memory cells are most commonly conductive floating gates but may alternatively be non-conductive dielectric charge trapping material.

FIG. 10 illustrates one implementation of the four charge levels used to represent two bits of data in a memory cell. In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

FIG. 10 is labeled as LM mode which may be referred to as lower at middle mode and will further be described below regarding the lower at middle or lower-middle intermediate state. The LM intermediate state may also be referred to as a lower page programmed stage. A value of "11" corresponds to an un-programmed state of the memory cell. When programming pulses are applied to the memory cell to program a page bit of the lower page, the level of charge is increased to represent a value of "10" corresponding to a programmed state of the page bit of the lower page. The lower page may be considered a logical concept that represents a location on a multi-level cell (MLC). If the MLC is two bits per cell, a logical page may include all the least significant bits of the cells on the wordline that are grouped together. In other words, the lower page is the least significant bits. For a page bit of an upper page, when the page bit of the lower page is programmed (a value of "10"), programming pulses are applied to the memory cell for the page bit of the upper page to increase the level of charge to correspond to a value of "00" or "10" depending on the desired value of the page bit of the upper page. However, if the page bit of the lower page is not programmed such that the memory cell is in an un-programmed state (a value of "11"), applying programming pulses to the memory cell to program the page bit of the upper page increases the level of charge to represent a value of "01" corresponding to a programmed state of the page bit of the upper page.

FIG. 11 is a diagram illustrating charge levels in a multi-level cell memory operated to store three bits of data in a memory cell. FIG. 11 illustrates MLC memory with three bits of data which are stored in a single cell by establishing eight states or voltage level distinctions. This memory may be referred to as X3 memory. FIG. 11 illustrates the stages that may be used for programming three bit memory. In a first stage, the voltage levels are divided out at two levels, and at the second stage (i.e. foggy program), those two levels are divided up into the eight states without setting the distinct levels between states. At the third stage (i.e. fine program), the voltage levels for each of the eight states are separated and distinct. The fine programming establishes the voltage levels for each of the states. As compared with two bit memory, the three bit memory requires more exact programming voltages to avoid errors. Electron movement or loss from the charge values may result in problems. Read disturb is caused by an electron/charge gain, while data retention errors are caused by an electron/charge loss. Specifically, read disturb errors may be caused when cells in a memory block change over time (e.g. become programmed unintentionally through charge gain). Conversely, data retention errors may be caused when cells in a memory block change over time because a charge loss causes programmed data to be lost.

The dual write programming (with a primary copy and secondary copy) as described above is described at block level (i.e. primary block and secondary block). The grouping of memory that is characterized by a block may be larger or smaller than the block size in other embodiments. For example, a meta-block or other block-group may be used rather than a block as is described in FIGS. 3-4. As described above, a block is referred to as the unit of memory for simplicity and ease of reference. Likewise, a block may be multi-dimensional so that one block may represent a multi-dimensional group of memory. In particular, the algorithm for retention leveling of block data may apply to three dimensional (3D) memory as well as two dimensional (2D) memory.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. A method for data transfer in a dual programming memory system comprising:
    receiving a request to write data from a host;
    programming the data in a primary copy with a default value for trim parameters;
    modifying the trim parameters to improve endurance;
    programming the data in a secondary copy with the modified trim parameters, wherein the primary copy and the secondary copy are used for the dual programming;
    modifying the trim parameters back to the default value; and
    wherein in response to the request, the dual programming comprises:
        checking for errors from the programming of the data to the primary copy;
        committing the data from the primary copy when there are no errors or failures with the primary copy; and
        committing the data from the secondary copy when there are errors or failures with the primary copy.

2. The method of claim 1 wherein the default value of the trim parameters results in an endurance that is lower than when the trim parameters are modified to improve endurance.

3. The method of claim 2 wherein the trim parameters comprise a program voltage, a step-up voltage, a delta voltage, a number of loops for the delta voltage, or a program pulse width.

4. The method of claim 3 wherein a level of the program voltage is modified to allow for an increased error tolerance.

5. The method of claim 1 wherein the data is only committed from the secondary copy when there are errors or failures with the primary copy.

6. The method of claim 1 further comprising:
    compacting the data when committed from the secondary copy.

7. The method of claim 6 wherein the compacting further comprises:
    transferring the data from the secondary copy to a controller;
    correcting any bits of the data in error; and
    transferring back to the memory system at a block different from the primary copy or the secondary copy.

8. The method of claim 1 wherein a pool of blocks from which the secondary copy is chosen from is reduced by the programming of the secondary copy with the modified trim parameters.

9. A dual programming system comprising:
    a memory comprising a plurality of blocks, wherein the dual programming includes writing data to a primary block and writing a copy of that data to a secondary block;
    a controller coupled with the memory and configured to receive a host write command and write the same data to both the primary block and the secondary block; and
    a dual write trim adjustment module coupled with the controller that is configured to adjust trim parameters before writing to the secondary block to improve endurance.

10. The system of claim 9 wherein the controller, for the dual programming, is configured to:
    program, from the host write command, data to both the primary block and the secondary block;
    check for errors due to the program of the primary block;
    commit the host write command from the primary block when there are no errors or failures with the primary block; and
    commit the host write command from the secondary block when there are errors or failures with the primary block.

11. The system of claim 9 wherein the trim parameters comprise a program voltage, a step-up voltage, a delta voltage, a number of loops for the delta voltage, or a program pulse width.

12. The system of claim 9 wherein the trim parameters are adjusted back to a default value after writing to the secondary block.

13. The system of claim 12 wherein the default value of the trim parameters results in an endurance that is lower than when the trim parameters are adjusted.

14. The system of claim 9 wherein the memory comprises non-volatile memory.

15. The system of claim 14 wherein the non-volatile memory comprises a flash memory and the flash memory comprises a three-dimensional (3D) memory configuration, and wherein the controller is associated with operation of and storing to the flash memory.

16. A method for reducing block allocation in a memory system, the method comprising:
  establishing a primary block and a secondary block for dual programming;
  receiving a host write for the dual programming, wherein data for the host write is programmed into the primary block and the same data is also programmed into the secondary block; and
  adjusting one or more trim parameters before programming the secondary block in response to the host write in order to improve endurance.

17. The method of claim 16 wherein the dual programming comprises programming both the primary block and the secondary block, wherein the secondary block is a backup for when there are errors in the primary block.

18. The method of claim 16 further comprising:
  adjusting the one or more trim parameters back to a default value after programming the secondary block.

19. The method of claim 18 wherein the default value of the trim parameters results in a lower endurance than the adjusted trim parameters.

20. The method of claim 16 wherein the secondary block comprises single level cell (SLC) memory.

* * * * *